March 11, 1930. J. W. KAOUGH 1,749,945
SECTIONAL WEDGE SLIP
Filed June 7, 1928 3 Sheets-Sheet 1
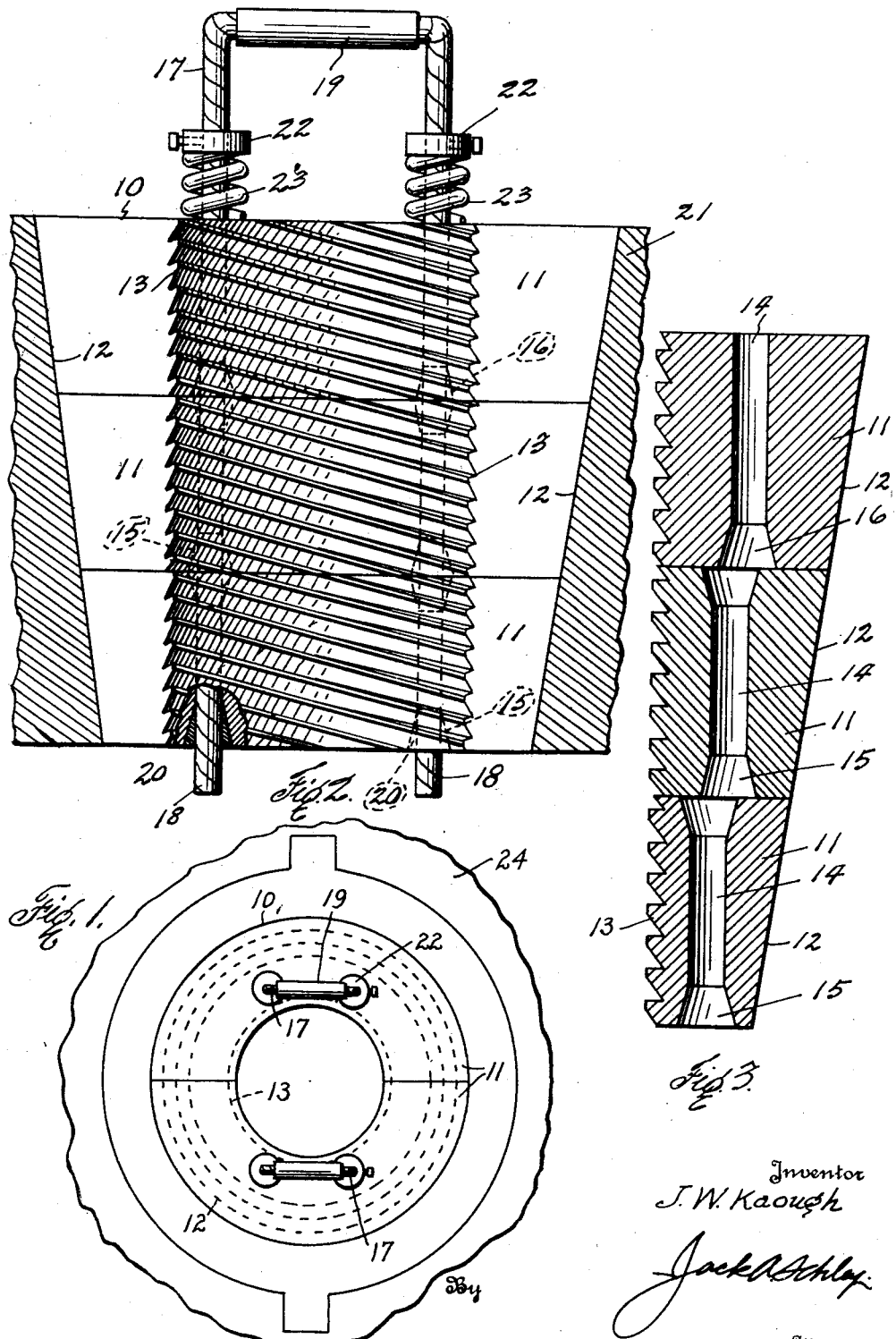

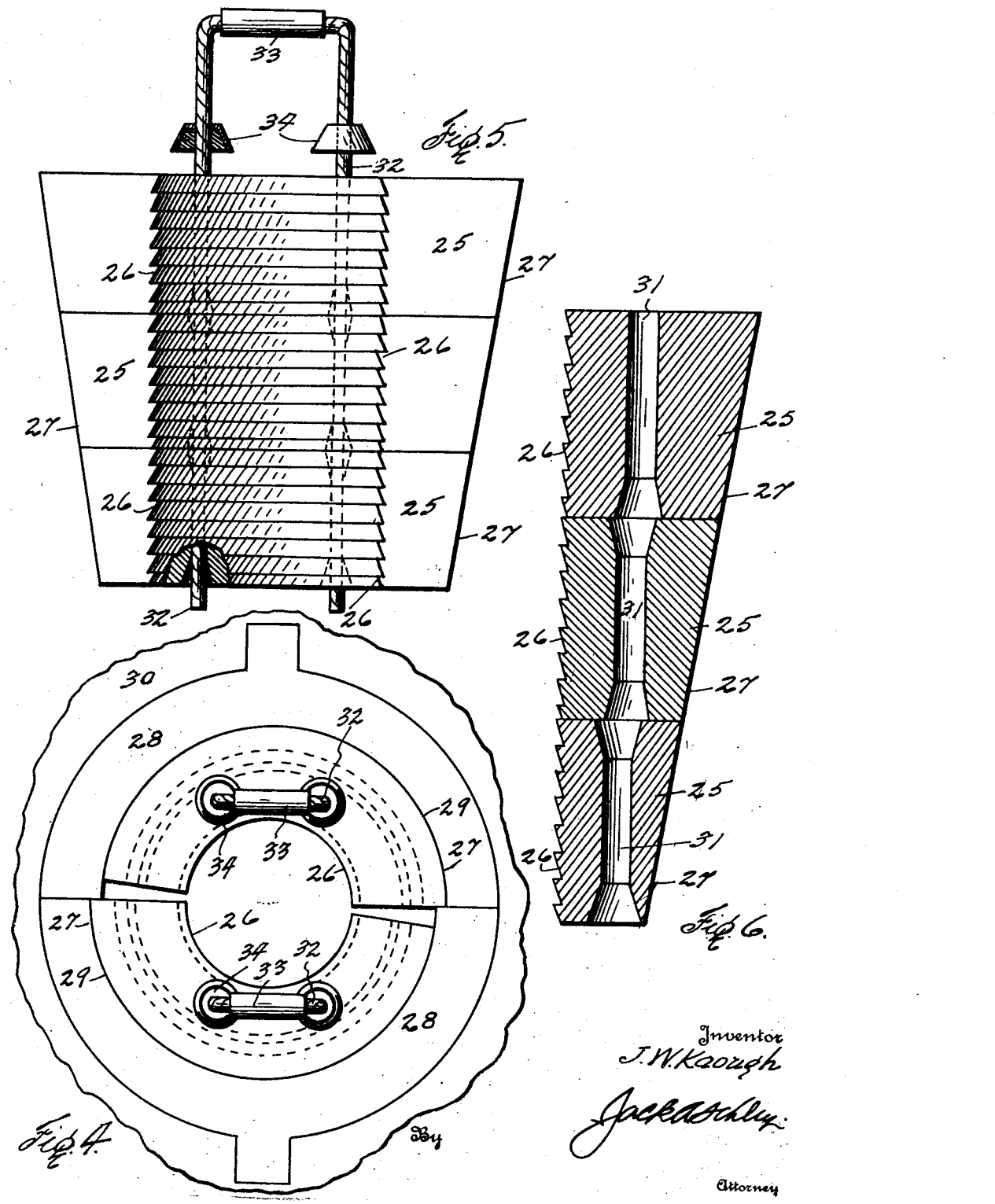

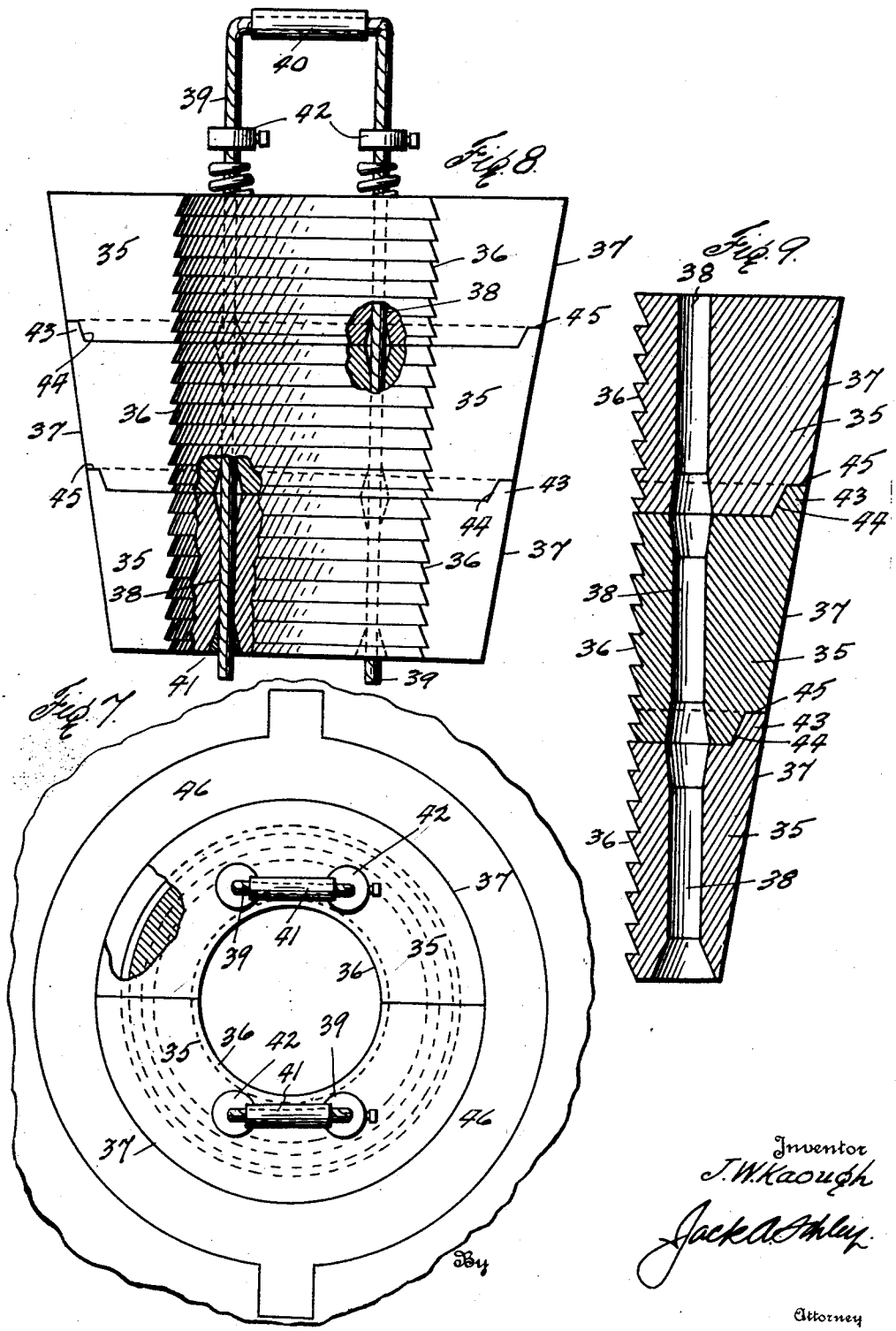

Patented Mar. 11, 1930

1,749,945

UNITED STATES PATENT OFFICE

JOSEPH W. KAOUGH, OF NEAR HOUSTON, TEXAS

SECTIONAL WEDGE SLIP

Application filed June 7, 1928. Serial No. 283,590.

This invention relates to a sectional wedge slip, and particularly to a construction adapted to automatically grip a pipe or drill rod in oil well operations by frictional engagement therewith due to the wedging action of the slip sections within a bushing.

In the ordinary construction of such slip sections each is formed as a solid unit and if there be a projection or depression upon the pipe or object held the gripping face of the slip does not secure proper engagement therewith, while in the use of the solid slip section it is difficult to fully introduce it into wedging engagement with the bushing if it be thrown into improper position owing to an irregularity upon the pipe surface. Even if the slip section is formed of segments movable laterally of the pipe upon their connecting bolts, the desired gripping action is not secured, as if the top segment be held by a projection upon the pipe the remainder are not free to move downwardly and inwardly into gripping contact at a lower point upon the pipe. Likewise if the upper segments engage the pipe and the lower segment is opposite a depression therein it cannot drop into position for more effective engagement with the pipe.

To avoid these objections and effect a more efficient operation this invention provides for the movement of the segmental members of the slip sections longitudinally upon their connecting means, so that if proper gripping engagement is not secured by one segment, the remaining segments may shift axially of the pipe to grip the same at other points thereon.

This axial movement of the segments relative to each other is combined with a sliding movement of the segment members laterally of the pipe and under the automatic control of a yielding connecting means, such as a cable, which extends through apertures in the segments and is secured to the lowermost segment. When the segments are fully seated in the bushing these apertures are out of direct alinement and the connector is bent laterally. If removed from the bushing and suspended the connector under tension assumes a taut position which causes the segments to be offset relative to each other as their apertures are alined.

When the lowermost segment is introduced into the bushing this strain on the connector causes the succeeding segments to be drawn inward and thus alined for passage into the bushing, which prevents the lower edge of any one of the succeeding segments from engaging or hanging upon the top of the bushing.

The invention also provides the apertures of the segments with flared or enlarged ends at the abutting faces of the segments to prevent shearing wear upon the yielding connecting cable. Means are also provided for limiting and cushioning the longitudinal movement of the segments upon this cable which also acts as a handle member for the slip section.

The invention has for an object to provide a novel and improved construction of sectional slip comprising apertured superposed members mounted for independent longitudinal movement upon a connector, whereby each member has axial travel relative to the object to be gripped thereby.

A further object of the invention is to present a new construction of superposed apertured slip segments or members mounted upon a laterally yielding connector which fills portions of the slip apertures and is adapted to automatically shift said members laterally when the connector is under tension.

Another object of the invention is to provide a novel sectional slip composed of a plurality of superposed segmental members movable laterally of the assembled slips and also movable axially thereof toward and from each other.

A still further object of the invention is to present an improved segmental member to be assembled into a slip section and formed with an aperture having a flared end to prevent shearing wear upon a yielding connector, and also movable longitudinally upon said connector toward and from its associated connector.

Other and further objects and advantages of the invention will be hereinafter set forth and the novel features thereof defined by the appended claims.

In the drawings—

Figure 1 is a top plan of the assembled slips;

Figure 2 is a side elevation of one slip section;

Figure 3 is a vertical section through the segmental members;

Figure 4 is a top plan of a modified form of the invention wherein the slip members are eccentrically mounted in the bushing;

Figure 5 is an elevation of one section;

Figure 6 is a vertical section through the segments;

Figure 7 is a plan of a further modification wherein the slip segments are seated within each other;

Figure 8 is an elevation thereof with parts in section; and

Figure 9 is a vertical section of the seated segments.

Like numerals refer to like parts in the several figures of the drawing.

The construction presented as an illustration of this invention is particularly adapted for use with a bushing carried by a rotary member and provides for holding a pipe or rod against rotative movement relative to such bushing. The structure and mounting of the segmental members comprising the segmental slips are not however limited to such application but may be applied for any supporting or retaining purpose desired. While the slips have been shown as formed in two sections the number of such sections may be varied as found most convenient or preferable for any particular use.

In the form of the invention shown in Figures 1, 2 and 3 the numeral 10 indicates the slip section formed of any desired number of separate superposed segments 11, each having an outer inclined or wedge face 12 and an inner gripping face 13 provided with spirally disposed teeth. These segment members 11 are provided with apertures 14 extending vertically therethrough, and the opposite ends of the apertures in the two lower members are enlarged or flared as at 15. The lower end of the aperture of the upper member is similarly flared at 16. When the members are alined with their inner and outer faces in a single plane the apertures are thrown out of direct alinement, and this condition exists when the slip is in gripping position.

A connector 17 extends through the apertures 14 and has a sliding fit therein but does not permit lateral movement of the segment upon the connector. For the purposes of this invention the connector is laterally yieldable and may comprise a steel cable which will bend when the apertures are offset, as in Figure 3, and also act to shift the segmental members laterally when such members are suspended by the taut cable and are free from an enclosing bushing.

As herein shown the connector comprises a U-shaped device having parallel legs 18 joined by a handle portion 19 above the slip. The lower end of each of these legs is secured at the flared opening 15 at the base of the lowermost segment, in any desired manner, such as by a Babbitt filling 20. The remaining segments are free to move axially or longitudinally upon the legs and in order to prevent them from engaging the handle 19 when the slip is removed from the bushing 21, stops 22 are secured to the connector. In order to cushion the movement of the slips toward the stops springs 23 may be interposed between the stops and the upper segment.

The bushing 21 is of the usual character and mounted in a rotary 24 in the ordinary manner, not specifically shown. The inclination or pitch of the spiral teeth 13 is opposite or relative to the direction of travel of the rotary in order to secure a firm grip upon the pipe when breaking-out a string of piping. In screwing up a string of pipe the same force is not necessary because an ordinary connection is made and the final tightening done incident to the subsequent drilling operation. For this reason it is not necessary to provide different inclinations of the teeth upon the opposite slip sections.

In the modified form of the invention shown in Figures 4, 5 and 6 the slip segments 25 are substantially the same in construction as the segment members 11 before described, with the exception that the inner toothed periphery 26 is concentric to the axis of the assembled slips while the outer wedging periphery 27 is eccentric to such axis and also to the inner periphery of the segment. The teeth in this form are disposed in parallel horizontal planes instead of spirally as before described. In order to secure continued bearing contact with the eccentric faces of the segments to prevent any tilting motion thereof the bushing sections 28 are formed with inner eccentric faces 29, as shown in Figure 4. This bushing is mounted in the usual rotary 30 and it will be seen that movement thereof, with the pipe held by the slips, will through contact of the eccentric faces produce an inward pressure upon the slips supplemental to the wedging action. This eccentric mounting is not claimed in the present application but forms the subject of a separate application filed June 7, 1928, Serial No. 283,591.

In this modified form the segments 25 are formed with the apertures 31 to receive the laterally bendable connector 32 having a handle 33 and stops 34, all of which operate as described in connection with Figures 1, 2 and 3.

A further modification of the invention is shown in Figures 7, 8 and 9 in which the segments 35 having their inner toothed faces 36 and outer wedging faces 37 both concentric to the axis of the assembled slips. These segments are formed with the aperture 38 to receive the laterally bendable connector 39 which is extended above the top segment to form a handle 40 for the slip. The lowermost segment is secured to the connector at 41 and stops 42 are provided between the handle and upper segment.

The segments are movable longitudinally upon the connector and are also capable of a lateral movement therewith which is guided by a circumferential flange 43 upon the upper face of each of the lower segments and having a downwardly inclined inner wall 44. The under face of each of the upper segments is formed with a groove 45 to receive this flange and shaped to correspond with said wall. When seated as in Figure 9 the segments may have a longitudinal and lateral movement incident to bending of the connector, but the apertures in the segments are not disposed out of direct alinement, as in Figure 3. The flanges 43 guide the introduction of the segments into the bushing 46, and otherwise the general operation is similar to that before described.

The mounting of the segments for longitudinal movement relative to the connector and lateral movement with said connector presents a very efficient construction adapted to firmly grip a rough or damaged pipe and to automatically adjust its segments into proper contact with such pipe. The threading of the connector through the off-set apertures permits the connector to actuate the segments when suspended thereon so that they may be properly alined for introduction into the bushing. The handle formed by the connector retains the segments in proper relation when removed from the bushing, and the stop prevents such segments from interfering with the use of the handle when in other than a vertical position. The invention presents a simple construction which can be economically manufactured and effectively applied as a replacement for many forms of slips now in use.

The specific construction of the invention has been shown and described but the invention is not confined thereto as changes and alterations may be made therein without departing from the spirit of the invention as recited in the following claims.

What I claim is—

1. A sectional slip composed of a plurality of superposed segmental members each having a work gripping face, and a connector upon which said members are mounted for independent axial movement relative to each other.

2. A sectional slip comprising superposed slip members each having a work engaging face and an aperture parallel thereto, the aperture in one member being at a different distance from said face than the aperture in a superposed member, and a laterally yielding connector passing through the slip apertures and arranged to coact with the walls thereof to automatically shift the slip members laterally when the connector is under tension.

3. A sectional slip as defined by claim 2, in which the apertures in the slip members are enlarged at the abutting faces of the members.

4. A sectional slip comprising a plurality of superposed members each having a work gripping face and movable laterally of the assembled slips and also movable axially toward and from each other.

5. A sectional slip comprising a plurality of superposed members each having a work gripping face and movable laterally of the assembled slips and also movable axially toward and from each other, and a handhold for the slip having an elongated connector for the members upon which they are movable laterally and axially.

6. A sectional slip comprising a plurality of superposed members each having a work gripping face and movable laterally of the assembled slips and also movable axially toward and from each other, and a handhold for the slip having an elongated connector for the members upon which they are movable laterally and axially, and a stop upon the connector for limiting the axial movement of the members thereon.

7. A sectional slip comprising a plurality of superposed members each having a work gripping face and movable laterally of the assembled slips and also movable axially toward and from each other, and a handhold for the slip having an elongated connector for the members upon which they are movable laterally and axially, and a stop upon the connector for limiting the axial movement of the members thereon, and a cushioning spring interposed between the stop and uppermost member.

8. A sectional slip comprising a plurality of superposed segmental members having apertures disposed out of direct alinement when the gripping faces of the slips are alined axially, and a flexible connector for said members extending through said apertures and forming means for suspending said members.

9. A sectional slip comprising a plurality of superposed segmental gripping members having apertures disposed out of direct alinement when the gripping faces of the members are alined axially, and a flexible connector for said members extending through said apertures and forming means for suspending said members, said gripping members being vertically separable from each other and free for movement longitudinally upon the connector.

10. A sectional slip comprising a plurality of superposed gripping members, and a laterally bendable connector extending through apertures in said members and provided with a supporting handle.

11. The combination with a bushing and a rotary connected thereto, of cooperating slips comprising a plurality of superposed gripping members mounted for independent movement axially of the bushing and also transversely thereof.

12. The combination with a bushing and a rotary connected thereto, of cooperating slips comprising a plurality of superposed gripping members mounted for independent movement axially of the bushing and also transversely thereof, the gripping faces of said members being provided with spirally disposed teeth.

13. A sectional slip comprising a plurality of superposed segmental wedge members each provided with an aperture enlarged at the meeting faces of the members and a U-shaped connector having laterally bendable portions filling a portion of the aperture of each member and secured to the lowermost member while the upper members are movable longitudinally of the connector.

14. A sectional slip comprising a plurality of superposed segmental wedge members each provided with an aperture enlarged at the meeting faces of the members and a U-shaped connector having laterally bendable portions filling a portion of the aperture of each member and secured to the lowermost member while the upper members are movable longitudinally of the connector, a stop upon the connector to limit such movement, and a cushioning spring disposed between the stop and upper member.

In testimony whereof I affix my signature.

JOSEPH W. KAOUGH.